Aug. 29, 1961     E. M. BURR     2,997,794
EDUCATIONAL DEVICE FOR TEACHING CHILDREN TO TELL TIME
Filed Dec. 14, 1959
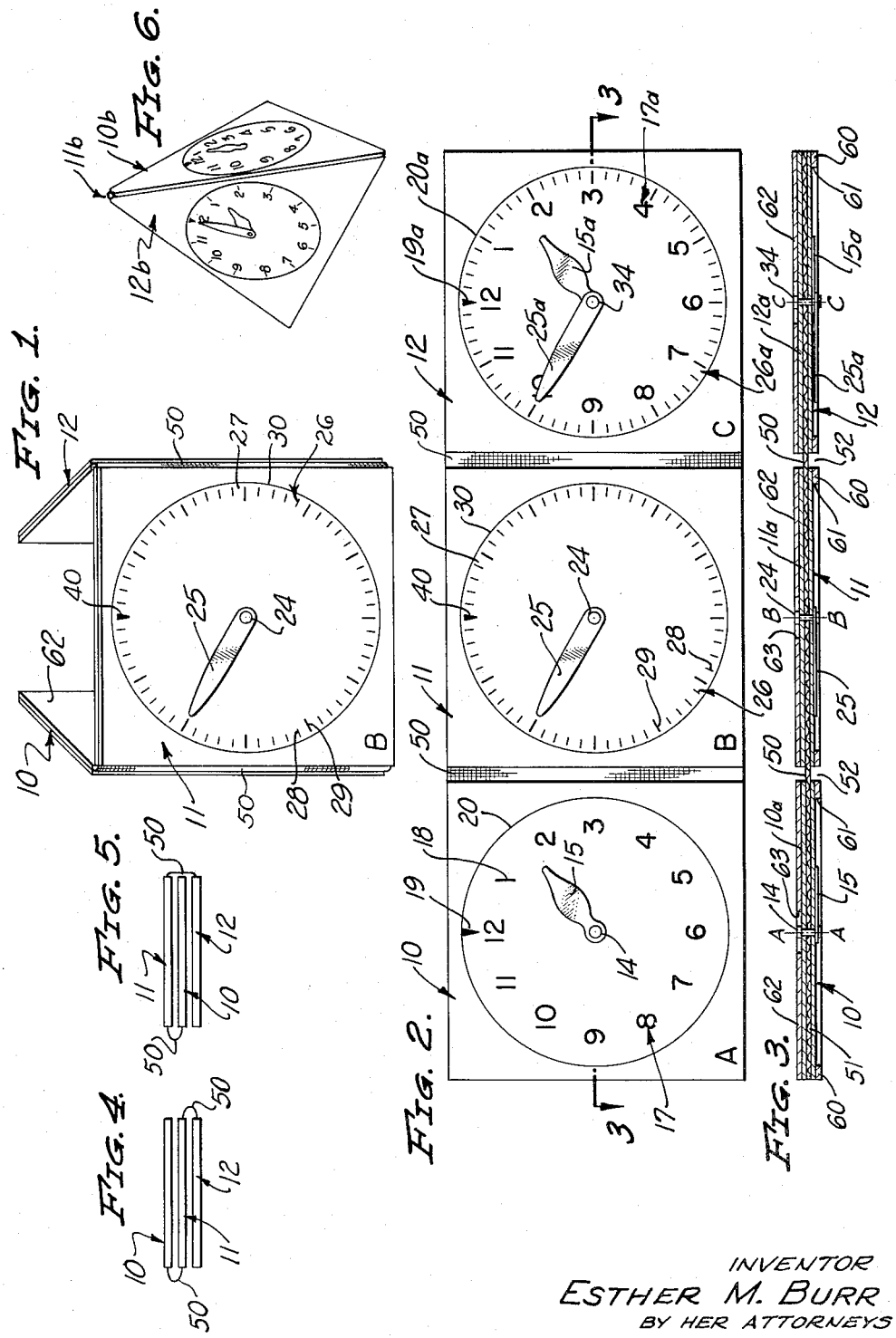
INVENTOR
ESTHER M. BURR
BY HER ATTORNEYS
HARRIS, KIECH, RUSSELL & KERN

United States Patent Office 2,997,794
Patented Aug. 29, 1961

2,997,794
EDUCATIONAL DEVICE FOR TEACHING CHILDREN TO TELL TIME
Esther M. Burr, 1237 E. 9th St., Upland, Calif.
Filed Dec. 14, 1959, Ser. No. 859,497
8 Claims. (Cl. 35—39)

My invention relates to educational devices or toys and more particularly to a device for teaching young children to tell time.

Grownups take almost for granted the telling of time without considering the complexity of the problem to a young child involving as it does the counting by units and fives, the thought of relative motion and, most of all, the association of the shorter hand with the hours and the longer hand with the minutes. It is an important object of the invention to provide a device which teaches such association more quickly and in a way to facilitate the time-telling when viewing the conventional two-hand clock.

Children become almost hopelessly confused initially by demonstrating a two-hand clock and attempting to explain the function of each hand. It is an object of the invention to segregate the functions of each hand, to display these hands and their pertinent background indicia separately on respective panels and then to display them compositely on a third panel. A further object is to associate colorwise the hour hand with the hour indicia or numerals on one panel, to associate colorwise the minute hand with appropriate minute indicia on a second panel and to correspondingly associate these hands and their respective indicia on a third panel simulating an actual clock face and its time-telling hands. The panels thus cooperate in separately supplying the functions of the hour hand and the minute hand which are combined in the third panel with characteristics identifying them and their functions in manner similar to the first two panels.

A further object is to provide a miltipanel teaching aid in which the panels are associated so that any one or any adjacent pair can be displayed. Preferably I prefer to hinge the three panels to each other so that they can be set up in stable three dimensional form with any panel or adjacent pair of panels facing the child. It is an object thus to associate three panels and to hinge them so they can be folded one on the others in different patterns.

Still other objects will be apparent from the drawing and following description which specifically disclose exemplary embodiments of the invention.

Referring to the drawing:

FIG. 1 is a perspective view of one embodiment of the invention in partially unfolded form to display the second of three panels to the child;

FIG. 2 is a face view of the three panels in completely unfolded relation;

FIG. 3 is a sectional view along the line 3—3 of FIG. 2;

FIGS. 4 and 5 are top views showing two ways of folding the device; and

FIG. 6 is a perspective view of an alternative embodiment having triangular panels.

Referring particularly to FIGS. 1, 2 and 3, the invention is shown as comprising three panels hinged together in side-by-side relation and respectively designated for convenience as a first or "A" panel 10, a second or "B" panel 11 and a third or "C" panel 12, each panel being here a four-sided figure, preferably substantially square.

Pivoted for manual movement about an axis A—A of the first or "A" panel 10 by any suitable eyelet or rivet 14 is an hour hand 15 preferably made of die cut plastic of a strong solid color. The attachment is such as to apply sufficient functional restraint to the hand 15 that it can be moved manually from one demonstration position to another but will be there restrained against self movement induced by gravity.

The panel 10 carries hour indicia 17 disposed in a twelve-division circular pattern about the axis A—A in an annular zone just beyond the locus of movement of the tip of the hour hand 15. The preferred pattern includes the hour numerals of a clock face arranged in large Arabic numerals 18 ranging from one to twelve and applied to the panel 10 at equal intervals in the aforesaid annular zone. A "start" indicia 19 may desirably be employed at the top or midnight-noon position. The numerals 18 should be large and bold and should be of the same strong solid color as the hour hand so that the child fixedly associates the hour hand 15 with the numerals 18 by color. By way of example, the hour hand 15 and the numerals 18 may be black against a white background. The zone of the panel 10 beyond a circular line 20 is preferably of some bright color such as red although the particular color is here primarily a matter of design except as it may be used to identify the panel in the mind of the child.

Similarly pivoted about an axis B—B of the second or "B" panel 11 by an eyelet or rivet 24 is a relatively long minute hand 25 preferably made of die cut plastic of a strong solid color different from the color of the hour hand 15 and the numerals 18. A brilliant red is excellent and will clearly distinguish the minute hand 25 from the hour hand 15. In addition these hands should be of distinguishing shape as well as size.

The panel 11 carries minute indicia 26 disposed in a circular pattern about the axis B—B in an annular zone 27 just beyond the locus of motion of the tip of the minute hand 25. The annular zone 27 is thus farther from its axis B—B than is the annular zone bearing the numerals 18 from its axis A—A. The preferred pattern of the minute indicia 26 is a subdivision of the annular zone 27 into sixty divisions represented by minute lines 28 extending radially between the inner and outer boundaries of the annular zone with every fifth division or minute line 29 accentuated, as by making it more pronounced by increased width and/or length, to represent a five-minute line 29.

It is important that the color of the pattern should match the color of the minute hand 25 and I prefer to make the annular zone 27 of this color with the lines 28, 29 of some contrasting color. In the example given a red minute hand 25 on a white background would be associated with a red annular zone 27 on which black lines 28, 29 are imprinted or otherwise formed. The black lines are sufficiently narrow as not to be identifiable by color and not to confuse the child with the aforesaid black-black relation between the hour hand 15 and its numerals 18. The zone of the panel 11 outwardly beyond a line 30 may be of some pleasing bright color such as blue to identify the panel but this is not essential. A "start" indicia 40 is preferably employed at the top position and corresponds in size and color (usually black) with the indicia 19 of panel "A."

Similarly pivoted about an axis C—C of the third or "C" panel 12 by an eyelet or rivet 34 are hour and minute hands 15a and 25a identical in color and shape with the hour hand 15 and the minute hand 25 respectively. These can be moved independently or in timed relation by the teacher to present problems in time solving and a demonstration of the degrees of relative movement of the two hands.

The panel 12 carries hour indicia 17a identical with the indicia 17 of panel "A" and minute indicia 26a identical with the indicia 26 of the panel "B"; also "start" indicia 19a identical with 19 and 40 of such panels. All such indicia are within a circular line 20a of the same diameter as lines 20 and 30. Outwardly beyond the line 20a is a zone that may be of some panel-identifying color differing from those of corresponding zones of the "A" and "B" panels, e.g., a bright yellow. The identity of the indicia 17, 17a and 26, 26a should be complete as to all details including preferably color. The hands 15a and 25a are seen on a background of a color identical with that of the circular portions of panels "A" and "B," typically white.

The three panels 10, 11 and 12 are preferably hinged together to fold flat or to open into a three dimensional figure to stand upright, e.g., an open three dimensional figure of FIG. 1 or a closed figure if the far edges of the end panels are brought together. Free hinging of adjacent panels in either of two opposite directions is preferred so that the panel sequences from the top of a folded unit may be 10, 11, 12 (FIG. 4); 10, 12, 11; 12, 10, 11; 11, 10, 12 (FIG. 5) etc. Cloth hinges 50 are preferred and one very satisfactory way of making the invention is to glue the panels 10, 11 and 12 to the face of a cloth panel 51 of a length greater than three times the width of each panel to leave hinge spaces 52 between the adjoining edges. Preferably backing panels 10a, 11a and 12a are adhered respectively opposite the main panels and may carry other attractive or instructive teaching aids related to time-telling.

Protection for the hands 15, 25, 15a and 25a can be achieved by adhering to the front of each panel 10, 11 and 12 a face element 60 with a central circular cut-out portion 61 of a diameter equal to that of the circular lines 20, 30 and 20a. Such face elements may be of the respective colors desired for the zones beyond these circular lines and the cut-out portions 61 may in fact determine the inner boundaries of such zones. The hands 15, 25, 15a and 25a can thus turn in spaces provided by the cut-out portions 61 and are thereby protected when the unit is folded. In like manner backing elements 62 may be adhered to the backing panels 10a, 11a and 12a to carry the aforesaid teaching aids and may provide central openings 63 receiving the head of the corresponding eyelet or rivet. The face elements 60 and the backing elements 62 are however optional and need not be employed. Whether or not used, the thickness of the composite "A," "B" or "C" panels should be such with relation to the width of the hinge spaces 52 that the panels can be folded together. In FIG. 3 the thickness of these composite panels is distorted and unduly large for purpose of clarity in showing the various layers, which may be pieces of cardboad, plywood, fiberboard or plastic.

An alternative arrangement of similarly pivoted panels is shown in FIG. 6 where three triangular panels 10b, 11b and 12b respectively with hands and indicia as previously described can be folded into a triangular pack or unfolded into a pyramid as shown.

In using the invention to teach a young child to tell time the teacher or parent unfolds the device with the panel "A" facing the child. By teaching the child that this is the hour hand and can reach only to the hour numerals the teacher can bring the two into association in the child's mind by relations of color and placement. The teacher is careful always to move the hour hand in a forward direction only, stopping it only at the exact hour or the half hour to teach these positions.

The "B" panel is later turned toward the child who is taught the movement represented by one minute and then five minutes and multiples thereof. Intervening minute positions are taught by adding 1, 2, 3 or 4 minutes to each five-minute mark. Always it is made clear that the minute hand is long enough to reach to the minute indicia. By color, shape and size relationships the child associates the minute hand and its indicia.

The "C" panel is later turned toward the child after the hours and minutes are well learned from the separate panels "A" and "B." The "C" panel permits the child to apply compositely the hour-telling and minute-telling mastered separately on the "A" and "B" panels. The correlations of color and size between the hour hand and its indicia and between the minute hand and its indicia remain to guide the child and aid in interpreting the composite.

When not in use the device can be folded into a compact ½' unit with its hands protected by the overfolded panels.

The illustrated embodiments are by way of example only and various changes and modifications can be made without departing from the spirit of the invention. In the accompanying claims which delineate the scope of the invention the reference to first, second and third panels is by way of differentiation and is not necessarily definitive of the sequence of their appearance in the group, the order of the panels in the group being a matter of choice.

I claim as my invention:

1. A device for teaching children to tell time including three separately-viewable panels comprising a first panel having a relatively short hour hand pivoted to move about an axis and hour indicia disposed in a twelve-division circular pattern about said axis, a second panel having a relatively longer minute hand mechanically independent of said hour hand pivoted to move about a second axis and minute indicia disposed in a sixty-division circular pattern about such second axis with each fifth division accentuated, and a third panel having an hour hand and a minute hand respectively mechanically independent of said hour hand of said first panel and said minute hand of said second panel but substantially duplicating in size and shape the corresponding hands of said first and second panels and pivoted about a third axis, said third panel having hour indicia and minute indicia substantially duplicating in size and shape corresponding indicia of said first and second panels; and means for connecting said three panels in adjoining side-by-side relationship.

2. A teaching device as defined in claim 1 in which said hour hands of said first and third panels are of the same color as said hour indicia thereof, and in which said minute hands of said second and third panels are of the same color as said minute indicia but of a color different than the color of said hour hands and hour indicia.

3. A teaching device as defined in claim 1 in which said panels are of the same size and including hinge means for connecting said panels together in side-by-side hinged relationship and means for frictionally restraining said hands to be movable manually and independently about their respective axes, the frictional restraint being sufficient to retain the corresponding hand against self movement induced by gravity.

4. A device for teaching children to tell time including three associated panels comprising a first panel having a relatively short hour hand pivoted to move about an axis and having hour indicia disposed in a twelve-division circular pattern about said axis, a second panel having a relatively longer minute hand pivoted to move about a second axis and minute indicia disposed in a sixty-division circular pattern about such second axis with each fifth division accentuated, and a third panel having an hour hand and a minute hand substantially duplicating corresponding hands of said first and second panels and pivoted about a third axis, said third panel having hour indicia and minute indicia substantially duplicating corresponding indicia of said first and second panels, said hour indicia of said first and third panels being twelve numerals of a color the same as said hour hands of said first and third panels, said minute indicia of said second and third panels comprising identically colored bands respectively concentric with said second and third axes, each band having sixty lineal indicia extending radially thereacross and terminating at the inner and outer boundaries of the corresponding band except that each fifth lineal indicia extends beyond at least one of the boundaries of its corresponding band, said minute hands of said second and third panels being of the same color as said identically colored bands but different than said color of said hour hands of said first and third panels.

5. A device for teaching children to tell time including three associated panels comprising a first panel having a relatively short hour hand pivoted to move about an axis and hour indicia disposed in a twelve-division circular pattern about said axis, a second panel having a relatively longer minute hand pivoted to move about a second axis and minute indicia disposed in a sixty-division circular pattern about such second axis with each fifth division accentuated, and a third panel having an hour hand and a minute hand substantially duplicating corresponding hands of said first and second panels and pivoted about a third axis, said third panel having hour indicia and minute indicia substantially duplicating corresponding indicia of said first and second panels, and means for hinging said panels in side-by-side relation to swing into angularly disposed planes to form a three dimensional structure restable on a supporting surface with said panels facing in different directions.

6. A teaching device as defined in claim 5 in which the hinge between the center panel and each end panel is a flexible member bridging a space between adjacent edges of such panels, each of said spaces being of a width sufficient to permit direct folding of an end panel to overlie the central panel irrespective of the interpositioning of the other end panel therebetween.

7. A teaching device as defined in claim 1 in which said panels are of the same size and face in different directions.

8. A teaching device as defined in claim 1 in which said minute indicia of said third panel comprises sixty lineal indicia with each fifth such lineal indicia accentuated in size and indicated by one of a series of twelve numerals, and in which said minute indicia of said second panel comprises sixty similar lineal indicia with each fifth lineal indicia similarly accentuated in size but free of said numerals.

References Cited in the file of this patent
UNITED STATES PATENTS

| | | |
|---|---|---|
| D. 160,077 | Eaves | Sept. 12, 1950 |
| D. 185,732 | Boldt | July 28, 1959 |
| 513,469 | Gerry et al. | Jan. 23, 1894 |
| 1,954,249 | Kehl | Apr. 10, 1934 |
| 2,177,234 | Walser | Oct. 24, 1939 |
| 2,361,563 | Pellaton | Oct. 31, 1944 |
| 2,629,186 | Biddlestone | Feb. 24, 1953 |
| 2,749,627 | Jones | June 12, 1956 |
| 2,837,838 | Lewis | June 10, 1958 |

FOREIGN PATENTS

| | | |
|---|---|---|
| 926,995 | France | Apr. 28, 1947 |